(12) United States Patent
Densborn et al.

(10) Patent No.: US 10,941,786 B2
(45) Date of Patent: Mar. 9, 2021

(54) HANDHELD WORK APPARATUS

(71) Applicant: Andreas Stihl AG & Co. KG, Waiblingen (DE)

(72) Inventors: Gerd Densborn, Waiblingen (DE); Harald Schliemann, Waiblingen (DE); Ralf Cornelsen, Aspach (DE); Wolfgang Weissert, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 165 days.

(21) Appl. No.: 16/131,930

(22) Filed: Sep. 14, 2018

(65) Prior Publication Data

US 2019/0085861 A1 Mar. 21, 2019

(30) Foreign Application Priority Data

Sep. 15, 2017 (EP) .................... 17001545

(51) Int. Cl.
*F04D 29/26* (2006.01)
*F16B 39/22* (2006.01)
(Continued)

(52) U.S. Cl.
CPC .......... *F04D 29/263* (2013.01); *A01G 20/47* (2018.02); *B25F 5/00* (2013.01); *B25F 5/008* (2013.01); *E01H 1/0809* (2013.01); *E01H 1/0827* (2013.01); *F01P 5/04* (2013.01); *F04D 1/0827* (2013.01); *F04D 17/16* (2013.01); *F04D 25/02* (2013.01);
(Continued)

(58) Field of Classification Search
CPC ........ F04D 29/263; F04D 17/16; F04D 25/02; F04D 29/023; A01G 20/47; B25F 5/00; B25F 5/008; E01H 1/0809; E01H 1/0827; E01H 2001/0881; F01P 5/04;
(Continued)

(56) References Cited

U.S. PATENT DOCUMENTS 4,295,753 A * 10/1981 Luerken .................. F02B 75/06
403/365
5,277,289 A * 1/1994 Dax ...................... F16D 35/022
192/58.5
(Continued)

FOREIGN PATENT DOCUMENTS

DE 3347289 A1 7/1984
WO 2012069770 A1 5/2012

*Primary Examiner* — Michael Lebentritt
*Assistant Examiner* — Eric J Zamora Alvarez
(74) *Attorney, Agent, or Firm* — Walter Ottesen, P.A.

(57) ABSTRACT

A handheld work apparatus has a blower wheel. The blower wheel is held via a nut on the shaft in a manner locked against rotation by frictional force. A thread moment of friction is transmittable between the nut and the shaft via a thread section. A first moment of friction is transmittable between the nut and the blower wheel via a first friction contact surface. The first friction contact surface is configured such that, at a minimum tightening torque of the nut, the first moment of friction is greater than the thread moment of friction. As a result, during the operation of the work apparatus when there is a relative movement between the blower wheel and the shaft, the blower wheel moves the nut along therewith. The nut retensions the blower wheel against the shaft. The second friction contact surface runs conically with respect to the rotational axis.

15 Claims, 6 Drawing Sheets

(51) Int. Cl.
*F04D 17/16* (2006.01)
*F04D 29/02* (2006.01)
*F02B 63/02* (2006.01)
*F04D 25/08* (2006.01)
*F04D 29/28* (2006.01)
*F04D 29/62* (2006.01)
*A01G 20/47* (2018.01)
*E01H 1/08* (2006.01)
*B25F 5/00* (2006.01)
*F04D 25/02* (2006.01)
*F01P 5/04* (2006.01)
*B08B 5/02* (2006.01)

(52) U.S. Cl.
CPC ............ *F04D 29/023* (2013.01); *F16B 39/22* (2013.01); *B08B 5/02* (2013.01); *E01H 2001/0881* (2013.01); *F02B 63/02* (2013.01)

(58) Field of Classification Search
CPC ........ F05D 2260/31; F16B 39/22; B08B 5/02; F02B 63/02
See application file for complete search history.

(56) References Cited

U.S. PATENT DOCUMENTS

| | | | |
|---|---|---|---|
| 7,363,886 B2 * | 4/2008 | Akaike | F01P 1/02 |
| | | | 123/185.3 |
| 9,206,567 B2 | 12/2015 | Kinoshita et al. | |
| 2008/0022552 A1 | 1/2008 | Forget | |

\* cited by examiner

HANDHELD WORK APPARATUS

CROSS REFERENCE TO RELATED APPLICATION

This application claims priority of European patent application no. 17 001 545.7, filed Sep. 15, 2017, the entire content of which is incorporated herein by reference.

BACKGROUND OF THE INVENTION

Blower apparatuses which can be handheld and include a housing with a combustion engine accommodated therein, and also a blower wheel arranged on the housing, are known. The blower wheel is arranged on a shaft driven by the drive motor and is fastened on the shaft in a manner clamped against a shaft shoulder via a nut. A disadvantage of blower apparatuses of this type is that the blower wheel can only be removed with difficulty.

SUMMARY OF THE INVENTION

It is an object of the invention to provide a handheld work apparatus having a blower wheel fastening which permits simple removal of the blower wheel.

This object can, for example, be achieved by a handheld work apparatus having: a shaft; a drive motor configured to drive the shaft in a rotating manner about a rotational axis; a nut; a blower wheel held on the shaft via the nut in a manner locked against rotation by frictional force; the nut and the shaft being in contact via a thread section wherein an acting thread moment of friction ($M_A$) acting about the rotational axis is transmittable between the nut and the shaft via the thread section; the nut and the blower wheel being in contact via a first friction contact surface wherein a first moment of friction ($M_1$) acting about the rotational axis is transmittable between the nut and the blower wheel via the first friction contact surface; the blower wheel and the shaft being in contact via a second friction contact surface; the nut having a minimum tightening moment between 10% and 100% of an operating torque; the first friction contact surface being configured in such a manner that, at the minimum tightening moment of the nut, the first moment of friction ($M_1$) transmittable between the nut and the blower wheel via the first friction contact surface is greater than the acting thread moment of friction ($M_A$), and therefore, during the operation of the work apparatus when there is a relative movement between the blower wheel and the shaft, the blower wheel moves the nut along therewith via the first moment of friction ($M_1$) acting at the first friction contact surface so that the nut retensions the blower wheel against the shaft via the second friction contact surface; and, the second friction contact surface running conically with respect to the rotational axis.

It is provided that, during the operation of the work apparatus, the blower wheel is held via a nut on the shaft in a manner locked against rotation by frictional force by an effective final tightening moment of the nut. A thread moment of friction acting about the rotational axis is transmittable between the nut and the shaft via a thread section. A first moment of friction acting about the rotational axis is transmittable between the nut and the blower wheel via a first friction contact surface. The first friction contact surface is configured in such a manner that, at a minimum tightening torque of the nut, the transmittable first moment of friction is greater than the acting thread moment of friction, wherein the minimum tightening moment is between 10% and 100% of the operating torque. As a result, during the operation of the work apparatus when there is a relative movement between the blower wheel and the shaft, the blower wheel moves along the nut therewith via the first moment of friction acting at the friction contact surface. As a result, the nut retensions the blower wheel against the shaft via the second friction contact surface. The second friction contact surface runs conically with respect to the rotational axis.

The retensioning of the nut during the operation of the work apparatus makes it possible for the operator, without intervention by the operator, to tension the nut against the shaft via the blower wheel with an only low tightening moment. The nut retensions the blower wheel as required based on the loads occurring during the operation of the work apparatus. Too high a tightening moment selected by the operator during the installation of the blower wheel is thereby substantially avoided. In addition, during the installation of the blower wheel, the operator can refrain from otherwise customary safety factors which are intended to avoid release of the blower wheel.

The nut is formed separately. The separate formation of the nut and the blower wheel affords the advantage that the overall release moment for removal of the nut and of the blower wheel is divided into a release moment of the nut and a release moment of the blower wheel. The release moment of the nut is thereby comparatively small, as a result of which the nut can be more easily released from the shaft.

The minimum tightening moment to be applied by the operator during the installation of the blower wheel should be selected to be of such a size that friction contact arises between the nut and the blower wheel, and the first moment of friction can be transmitted in the friction contact of the first friction contact surface. Automatic retensioning of the blower wheel is already achieved here at a minimum tightening moment of at least 10%, advantageously of at least 20%, in particular of at least 30% of the operating torque. The operating torque is the moment which is transmittable between the shaft and the blower wheel during the operation of the work apparatus. The automatic retightening of the blower wheel is provided whenever the minimum tightening moment applied by the operator is advantageously between 10% to 90%, in particular between 30% to 80% of the operating torque. The operating torque can advantageously be at least 80 Nm, in particular at least 100 Nm. By means of the retensioning of the blower wheel against the shaft by the nut, the tightening moment is selected according to requirements to be of a size necessary for the fastening of the blower wheel during the operation of the work apparatus. Too high a tightening moment is thereby avoided.

In the second friction contact surface which runs conically, a cone friction force acts at a distance from the rotational axis in the peripheral direction of the rotational axis. The cone friction force is a friction contact force. On account of its distance from the rotational axis, the cone friction force in the second friction contact surface generates the second moment of friction acting about the rotational axis. The conicity of the second friction contact surface results in a wedge effect. This wedge effect brings about an increase in the friction contact forces in the second friction contact surface between shaft and blower wheel in relation to a friction contact surface running perpendicularly to the rotational axis, and therefore high moments of friction can be transmitted in the second friction contact surface which runs conically. As a result, even at a lower tightening moment, the second moment of friction in the second friction contact surface is of a size sufficient to hold the blower wheel on the shaft without slippage and in a manner locked by frictional force. On account of the capability of transmitting the high second moment of friction, the conicity of the second friction contact surface also permits a reduction in the diameter of the shaft at the cone. The shaft can thereby be dimensioned to be small and construction space can be saved.

The conicity of the second friction contact surface brings about an increase in the contact surface in relation to a contact surface, running radially with respect to the rotational axis, between blower wheel and shaft. This reduces the surface pressure in the second friction contact surface, and possible cold weldings between shaft and blower wheel are avoided. Easy removal of the blower wheel from the shaft is thereby made possible.

The second moment of friction in the second friction contact surface can advantageously be greater than the thread moment of friction in the thread section. The second moment of friction can advantageously correspond to at least 1.3 times, in particular at least 1.5 times the thread moment of friction.

It can advantageously be provided that a tangential force, which generates the first moment of friction, at the first friction contact surface acts at a distance from the rotational axis in the peripheral direction of the rotational axis. The distance from the rotational axis can advantageously correspond to at least 1.5 times the inner radius of the nut at the thread section. The tangential force corresponds to the resulting friction contact force in the first friction contact surface. On account of its distance from the rotational axis, the tangential force generates the first moment of friction which acts about the rotational axis. If the diameter of the first friction contact surface is increased, the distance between the acting tangential force and the rotational axis is increased. The first moment of friction is also increased here.

It can advantageously be provided that the second friction contact surface and the rotational axis enclose an angle of at least 15°, advantageously of at least 20°, in particular of at least 25°. The second friction contact surface and the rotational axis advantageously enclose an angle of at most 80°, advantageously of at most 75°, in particular of at most 70°. The second friction contact surface can advantageously be configured and arranged in such a manner that, in the second friction contact surface, there is no self-locking between the blower wheel and the nut.

As the angle between the second friction contact surface and the rotational axis is reduced, the contact force between the shaft and the blower wheel, and therefore also the cone friction force in the second friction contact surface are increased while the tightening moment remains the same. As a result, the second moment of friction is also increased. As a result of the wedge effect between blower wheel and shaft and the resulting reinforcement of the cone friction force, the tightening moment can be reduced and nevertheless a sufficiently large second moment of friction can be generated such that the blower wheel is held on the shaft during operation without slippage and in a manner locked by friction. The release moment of the nut for removal of the blower wheel from the shaft is thereby reduced.

If the angle between the second friction contact surface and the rotational axis is advantageously at least 15°, the length of the cone, as measured in the direction of the rotational axis, is comparatively small in relation to the length of a self-locking cone. The angle between the friction contact surface and the rotational axis therefore permits a construction-space-saving fastening of the blower wheel on the shaft in the axial and radial direction of the rotational axis.

As a result of the fact that there is no self-locking between blower wheel and the shaft, the blower wheel, if the nut has been released from the shaft, can be pulled from the shaft in a simple manner, in particular without the aid of a special tool, such as, for example, a pulling-off device.

It can advantageously be provided that the second friction contact surface consists of two surfaces which are in contact, wherein the surfaces are a contact surface of the shaft and a contact surface, in particular a second contact surface of the blower wheel. The contact surfaces can advantageously be extensively in contact with each other. However, it is also possible for just single line contact to be provided at an in particular large diameter of the cone of the shaft and of the hub. One of the two surfaces, which are in contact, of the second friction surface can advantageously have a coating and/or a profiling for increasing the friction value. The increase in the friction value results in an increase in the maximally acting tangential force and therefore an increase in the second moment of friction.

It can advantageously be provided that, in a top view of a longitudinal plane containing the rotational axis, the angle between the second contact surface of the blower wheel and the rotational axis is smaller than the angle between the contact surface of the shaft and the rotational axis. The difference in the angles can advantageously be less than one degree, in particular less than half a degree. This ensures that, when the blower wheel is installed on the shaft, the second contact surface of the blower wheel and the contact surface of the shaft come into contact at a maximum distance from the rotational axis. A maximum distance between the tangential force and the rotational axis thereby also arises. The maximum distance between the tangential force and the rotational axis also necessitates a transmittable second moment of friction which is as large as possible.

The first friction contact surface can advantageously consist of two surfaces which are in contact, wherein the surfaces are a contact surface of the nut and a contact surface, in particular a first contact surface of the blower wheel. At least one of the two surfaces, which are in contact, of the first friction surface preferably has a coating and/or a profiling, for increasing the friction value. Via the coating or at the profiling, the friction value in the first friction contact surface and therefore the tangential force can be increased. The first moment of friction can thereby be configured to be higher than the thread moment of friction.

It can advantageously be provided that the thread is in the form of a fine pitch thread. The fine pitch thread is defined in accordance with DIN ISO 261/262. The fine pitch thread is preferably in the form of a metric thread with a nominal diameter 12 and a pitch of 1.25. On account of the small pitch, the initial resistance during tightening of the nut is reduced in relation to a regular thread. This simplifies the turning of the nut by the blower wheel. In addition, a higher load can be absorbed via the fine pitch thread, and therefore the shaft can be formed with a small diameter in the thread section.

It can advantageously be provided that a cylindrical section is formed on the shaft, and the blower wheel is supported against inclination with respect to the shaft on the cylindrical section. This permits a high degree of concentricity accuracy of the blower wheel and avoids an imbalance of the blower wheel. Since a cylindrical section can be produced comparatively simply and favorably in relation to a thread section having small tolerances, a precise and favorable orientation of the blower wheel on the shaft can be achieved by separating the functions of supporting and clamping the blower wheel on the shaft.

The blower wheel can advantageously include a hub and a wheel which is fastened on the hub. The hub can advantageously be composed of a metal, in particular a sintered metal, preferably of a sintered steel material. The hub is in particular at least partially, preferably completely, composed of a hardened carbon steel.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
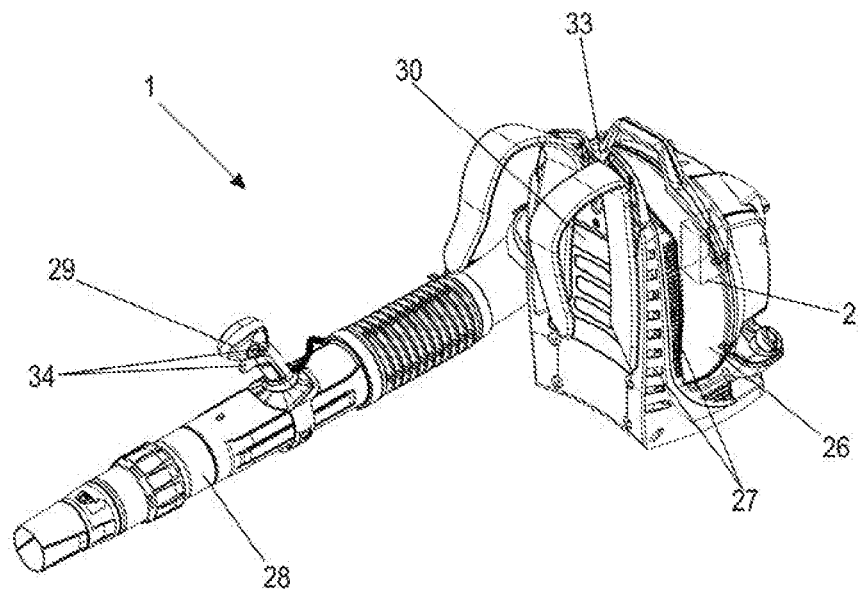
FIG. 1 shows a schematic illustration of a blower apparatus.

FIG. 1 shows a blower apparatus 1 as an embodiment of a handheld work apparatus. The blower apparatus 1 has a back carrier 30 which can be carried on the operator's back and to which a housing 26 is secured. However, the blower apparatus 1 can also be a portable blower apparatus 1. Instead of a blower apparatus 1, the present invention may also be advantageous in the case of other handheld work apparatuses, in particular in the case of suction apparatuses, power saws, angle grinders, brush cutters or the like. A drive motor 2 which, in the embodiment, is in the form of a combustion engine is arranged in the housing 26. The drive motor 2 (illustrated schematically) can advantageously be a single-cylinder engine, in particular a two-stroke engine or a mixture-lubricated four-stroke engine. However, the drive motor 2 may also be an electric motor which is in particular supplied with energy from a battery. The blower apparatus 1 has a blower helix 33 through which a working air flow is conveyed. The blower helix 33 is adjoined by a blowpipe 28. A handle 29 with which the operator can guide the blowpipe 28 is arranged on the blowpipe 28. Operator-controlled elements 34, namely a throttle lever, a throttle lever lock and a stop switch, are arranged on the handle 29. Further or other operator-controlled elements 34 can also be provided. A blower wheel 7 (see FIG. 2) which is driven via a shaft 3 of the drive motor 2 is arranged in the housing 26. In the embodiment, the shaft 3 is the crankshaft of the drive motor 2. The blower wheel 7 takes in working air via air intake gratings 27 which are provided on the housing 26 and on the back carrier 30. The blower wheel 7 conveys the working air into the blower helix 33 and from there into the blowpipe 28. However, the blower wheel 7 can also be a blower wheel for conveying cooling air, in particular cooling air for the drive motor 2.

Figure 2:
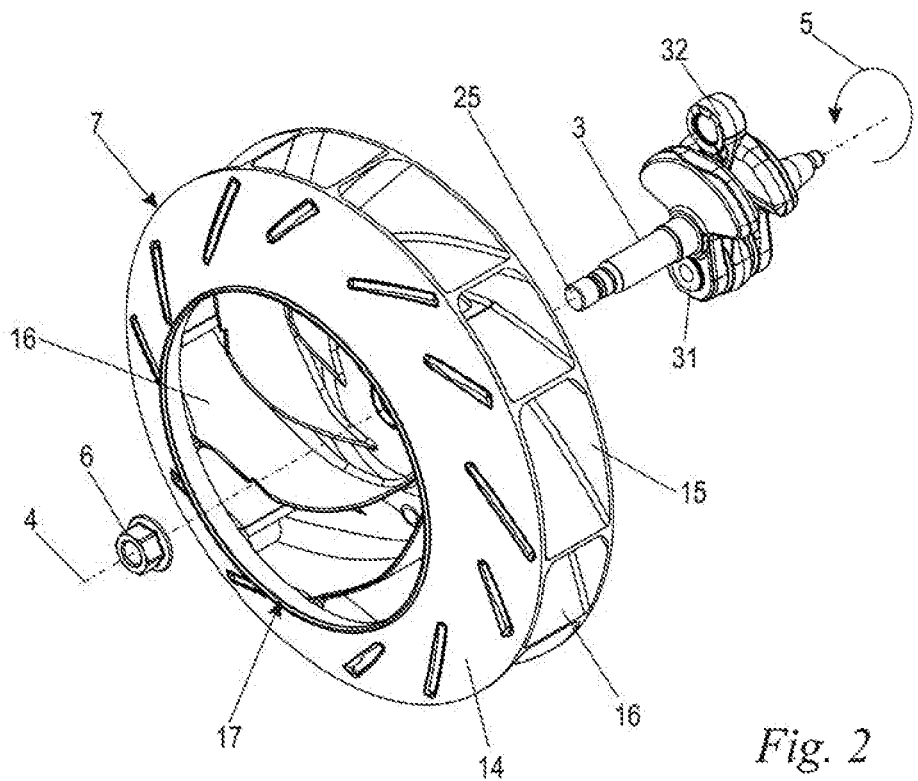
FIG. 2 shows a perspective exploded illustration of the blower wheel and of the driveshaft of the blower apparatus according to FIG. 1.

FIG. 2 shows the shaft 3 of the drive motor 2 (not shown in FIG. 2). A piston (not illustrated) of the drive motor 2 drives the shaft 3 via a connecting rod 32, wherein the connecting rod 32 is connected to the shaft 3 via a crank pin 31. The shaft 3 has a first end 25. The blower wheel 7 is pushed over the first end and fastened on the shaft 3 via a nut 6. The nut 6 is formed separately. The nut 6 is formed in particular separately from the blower wheel 7. The shaft 3 has a rotational axis 4 and, in the embodiment, is driven by the piston in a manner running counterclockwise in a rotational direction 5 from the nut 6 to the connecting rod 32, in the viewing direction of the rotational axis 4.

In the embodiment, the blower wheel 7 is in the form of a radial blower and has vanes 16 for conveying the air. The blower wheel 7 has a single-part basic body which is constructed from two disks 14 and 15, between which the vanes 16 extend. The vanes 16 of the blower wheel 7 run spirally toward the rotational axis 4. The disk 14 has an opening 17. During the operation of the handheld work apparatus 1, the blower wheel 7 rotates about the rotational axis 4 in the rotational direction 5, and the working air is taken in via the opening 17, is conveyed outward by the vanes 16 of the blower wheel 7 and conducted into the blower helix 33 (not illustrated in FIG. 2). The working air flows from there through the blowpipe 28 into the surroundings.

Figure 3:
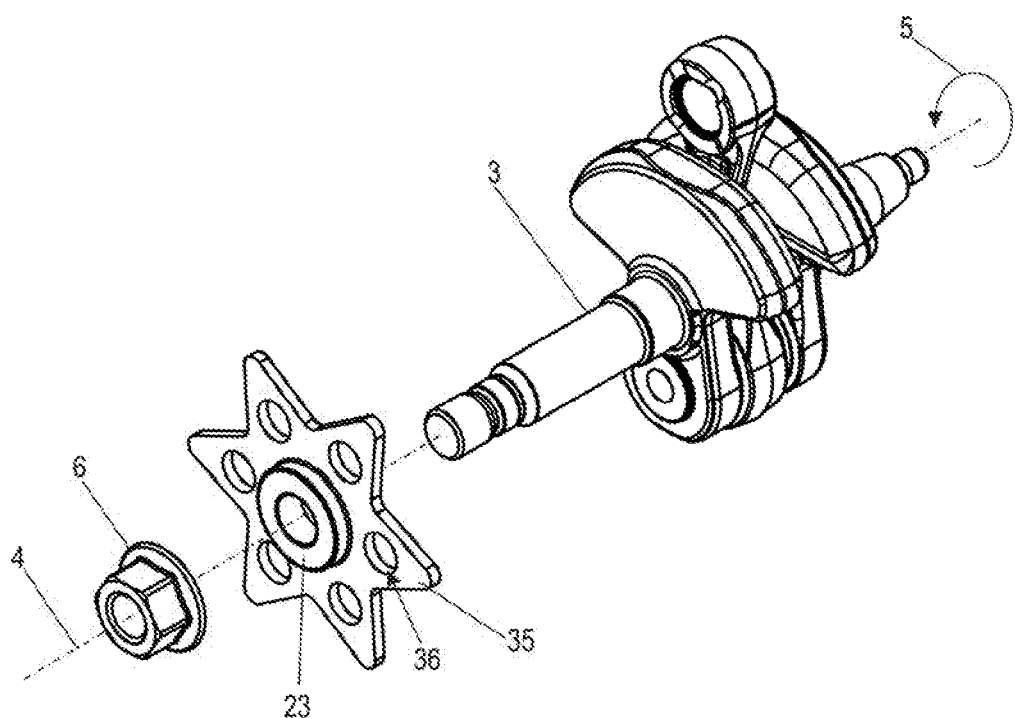
FIG. 3 shows a perspective exploded illustration of the hub of the blower wheel and of the driveshaft of the blower apparatus according to FIG. 1.

FIG. 3 shows the same embodiment as FIG. 2, wherein only one hub 23 of the blower wheel 7 is illustrated. The hub 23 is connected to the disk 15 of the basic body of the blower wheel 7, in particular is embedded therein, and insert molded in the embodiment. The hub 23 is held clamped on the shaft 3 via the nut 6. If the nut 6 is insufficiently tightened or not tightened, the hub 23 of the blower wheel 7 can rotate on the shaft 3. In the embodiment, the hub 23 is composed of a sintered material, in particular of a sintered steel material. The hub 23 is preferably at least partially, in particular completely, composed of hardened carbon steel. In the embodiment, the hub 23 of the blower wheel 7 is of star-shaped configuration and has six teeth 35 pointing in the radial direction with respect to the rotational axis. Each individual tooth 35 contains an opening 36 which runs parallel to the rotational axis 4.

Figure 4:
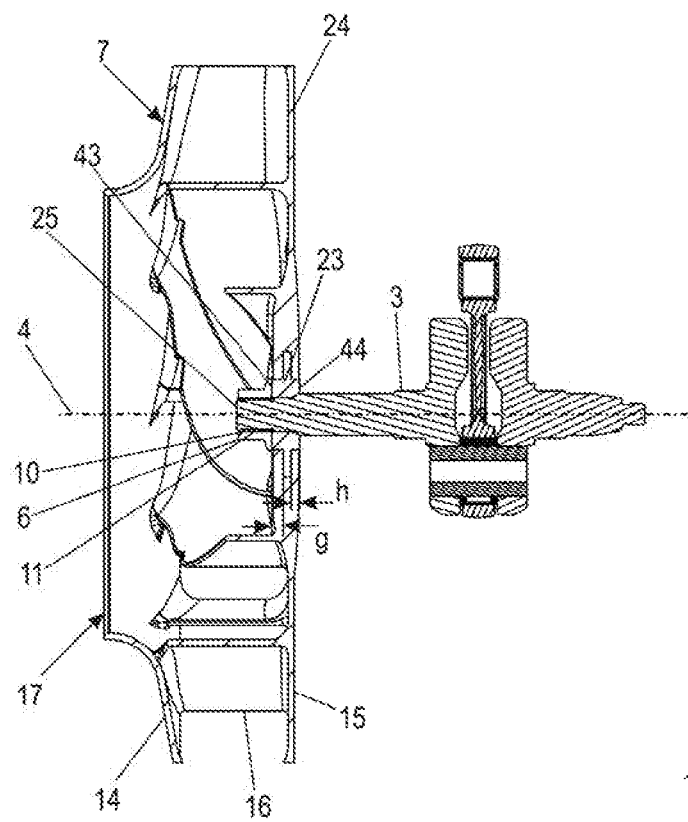
FIG. 4 shows a sectional illustration of the blower wheel and of the driveshaft of the blower apparatus according to FIG. 1.

As shown in FIG. 4, the blower wheel 7 includes the hub 23 and a wheel 24. The hub 23 is cast in the wheel 24, in an embodiment is placed into the wheel 24 and insert molded therein. The separate formation of the wheel 24 and of the hub 23 permits a simplified production of surfaces with exacting tolerances in those regions of the blower wheel 7 which enter into contact with the shaft 3 and the nut 6. In the embodiment, the wheel 24 is composed of a plastic, but may advantageously also be composed of an aluminum alloy or another material. The cast wheel 24 runs through the openings 36 in the hub 23. This gives rise between the hub 23 and the wheel 24 to a form-fitting connection which can be subjected to a particular load in the peripheral direction with respect to the rotational axis 4. The star shape of the hub 23 results in a form-fitting connection between hub 23 and wheel 24, which connection can be subjected to a high load in the peripheral direction with respect to the rotational axis. Instead of the star shape, another expedient contour which is form-fitting in the peripheral direction and has sections of different diameter may also be selected. The following statements regarding the star shape apply equally to such contours.

The hub 23 is subject to different loads than the wheel 24 and, in the embodiment, is produced from a different material. As a result of the production of the blower wheel 7 from at least two different materials, the mass of the blower wheel 7 can be reduced. In an embodiment, the blower wheel 7 can also be produced from one material and/or as a single part. The hub 23 has two outer front ends 43, 44 which are approximately perpendicular to the rotational axis 4, wherein the first front end 43 of the hub 23 faces the nut 6 and the second front end 44 of the hub 23 faces away from the nut. The teeth 35 have a distance g, as measured in the direction of the rotational axis 4, from the first front end 43 of the hub 23 and a distance h, as measured in the direction of the rotational axis 4, from the second front end 44 of the hub 23. The teeth 35 are formed on the hub 23 in such a manner that the distance g is greater than the distance h. Accordingly, the teeth 35 lie closer to the second front end 44 than to the first front end 43.

FIG. 4 shows the blower wheel 7 mounted on the shaft 3. The hub 23 of the blower wheel 7 is in contact here with the shaft 3. At the blower-wheel-side first end 25 of the shaft 3, the shaft 3 has a thread 10 which extends over a thread section 11. The nut 6 is screwed onto the thread section 11 of the shaft 3 against the hub 23 of the blower wheel 7. In order to avoid loosening of the nut 6 during the operation of the handheld work apparatus 1, the thread 10 of the shaft 3 is configured in such a manner that the nut 6 is securely tensioned against the hub 23 of the blower wheel 7 counter to the rotational direction 5 of the shaft 3. Since, in the embodiment, the rotational direction 5 of the shaft 3 runs counterclockwise in a manner running from the blower wheel 7 to the connecting rod 32 in the direction of the rotational axis 4, the thread 10 is in the form of a right-handed thread.

Figure 5:
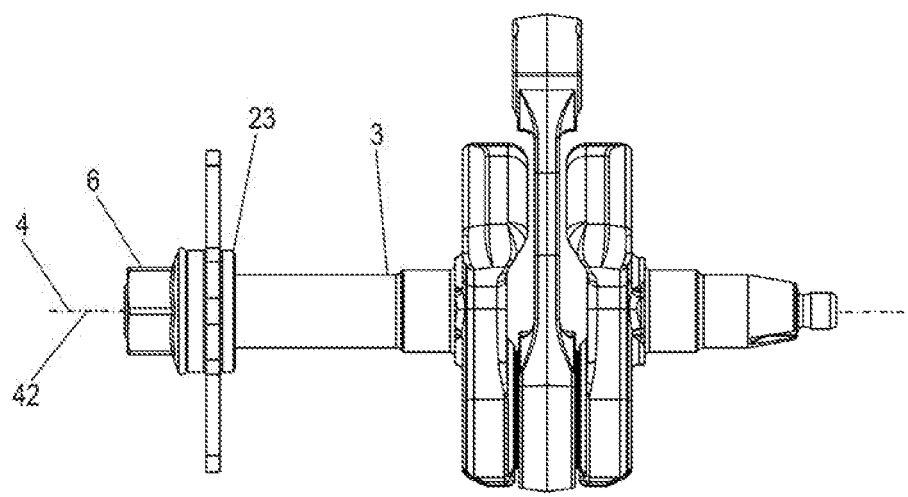
FIG. 5 shows a side view of the hub of the blower wheel and of the driveshaft of the blower apparatus according to FIG. 1.
Figure 6:
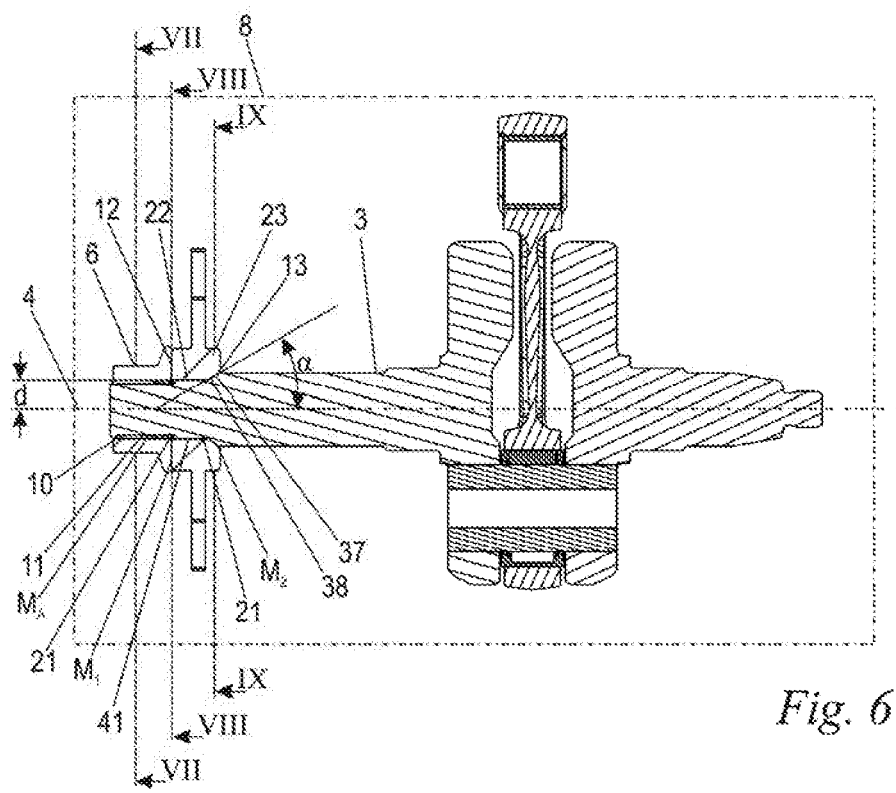
FIG. 6 shows a sectional illustration of the hub of the blower wheel and of the driveshaft of the blower apparatus according to FIG. 1.
Figure 11:
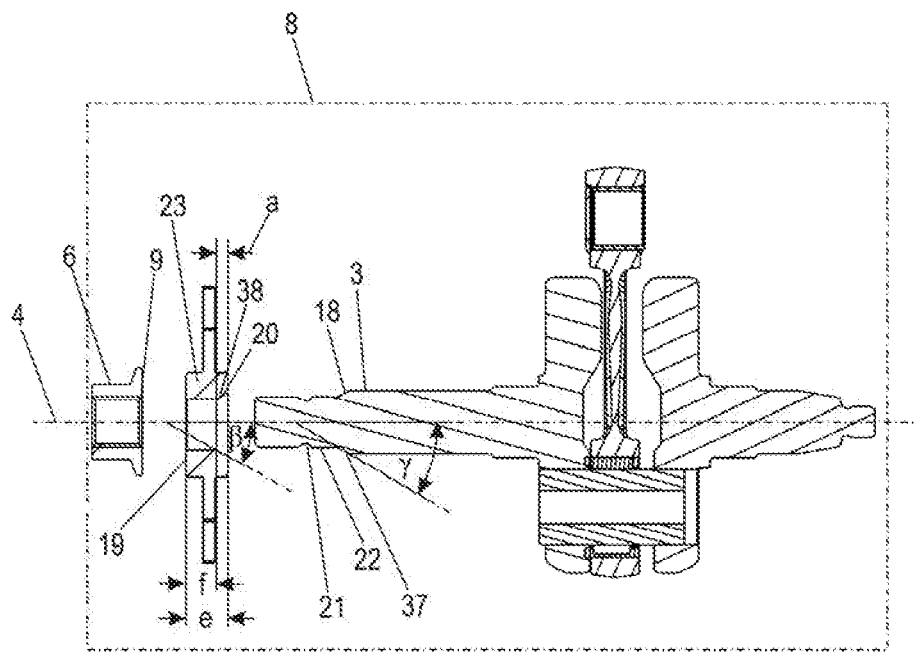
FIG. 11 shows a sectioned exploded illustration of the hub of the blower wheel and of the driveshaft of the blower apparatus according to FIG. 1; and, FIG. 12 shows an enlarged partial sectional illustration of the blower wheel and of the driveshaft of the blower apparatus according to FIG. 1.

As shown in FIGS. 5 and 6, the hub 23 is fastened in a manner held clamped on the shaft 3 via the nut 6. As FIG. 6 shows, the thread section 11, an undercut 21, a cylindrical section 22, an undercut 21 and a cone 37 are formed on the shaft 3, running from the first end 25 thereof toward the connecting rod 32. The hub 23 is centered by the cone 37 of the shaft 3 and by the cone 38 of the hub 23. The cylindrical section 22 of the shaft 3 has an only slightly smaller diameter than the cylindrical section 41 of the hub 23 and therefore serves for limiting the inclination of a longitudinal axis 42 of the hub 23 with respect to the rotational axis 4. The thread section 11 can expediently be pulled up onto the undercut 21 of the shaft 3, and the thread 10 can be formed in such a manner that the hub 23 can also be directly supported on the thread section 11. The cone 37 of the shaft 3 opens in the direction of the connecting rod 32. The hub 23 of the blower wheel 7 has a cylindrical section 41 with a length e, as measured in the direction of the longitudinal axis 42 of the hub 23 (FIG. 11). In the embodiment, the cylindrical section 41 merges into a cone 38, which opens toward the connecting rod 32, of the hub 23. The cylindrical section 41 extends in particular over more than half of a length f, as measured in the direction of the longitudinal axis 42 of the hub 23 (FIG. 11), of the hub 23. It may be expedient, instead of or in addition to the cone 38 of the hub 23, to provide another inner contour in the hub 23, in which the hub 23 increases its distance s, as measured radially with respect to the rotational axis 4, in relation to its cylindrical section 41. Owing to the fact that the teeth 35 lie closer to the second front end 44 of the hub 23 than to the first front end 43 of the hub 23, the hub 23 is reinforced at its cone 38 and an expansion of the hub 23 during the pressing onto the cone 37 of the shaft 3 is avoided. Even in the case of other expedient contours which are form-fitting in the peripheral direction, an expansion of the hub 23 can be avoided if the corresponding contour lies closer to the second front end 44 of the hub 23 than to the first front end 43 of the hub 23.

As FIG. 6 shows, in the mounted state the hub 23 lies with its cylindrical section 41 against the cylindrical section 22 of the shaft 3 in the radial direction of the rotational axis 4. The cylindrical sections 22 and 41 support the hub 23 on the shaft 3 and therefore limit the inclination of the longitudinal axis 42 of the hub 23. In the axial direction of the rotational axis 4, the hub 23 comes to lie in its cone 38 against the cone 37 of the shaft 3 in a second friction contact surface 13, as a result of which the hub 23 is centered on the shaft 3. The nut 6 which is screwed onto the thread section 11 of the shaft 3 makes contact with the hub 23 of the blower wheel 7 in a first friction contact surface 12 and thereby clamps the hub 23 against the cone 37 of the shaft 3.

As FIG. 6 shows, the second friction contact surface 13 together with the rotational axis 4 forms a contact surface angle α which opens in the direction of the connecting rod 32. In the embodiment, the contact surface angle α is at least 15°, in particular at least 20°, preferably at least 25°. In the embodiment, the contact surface angle α is at most 85°, in particular at most 80°, preferably at most 75°. Via the contact surface angle α of the second friction contact surface 13, the shaft 3 is tensioned in its cone 37 against the cone 38 of the hub 23 in the manner of a wedge. As a result of the wedge effect occurring in the second friction contact surface 13, the contact force between shaft 3 and hub 23 is reinforced in comparison to a contact surface oriented radially with respect to the rotational axis 4. The smaller the contact surface angle α is, with the value 0° being excluded from the contact surface angle α, the greater is the contact force acting in the second friction contact surface 13. In the embodiment, the contact surface angle α is selected to be at least of a size such that there is no self-locking between the blower wheel 7 and the shaft 3.

As FIG. 6 shows, various moments can be transmitted in the mounted state of the hub 23 on the shaft 3. As a result of the tensioning of the nut 6 against the hub 23, a closed force flux arises which starts from the thread 10 of the shaft 3, merges via the nut 6 into the hub 23, and runs again from the hub 23 into the shaft 3. A thread moment of friction $M_A$ can be transmitted between shaft 3 and nut 6 in the thread section 11. A first moment of friction $M_1$ can be transmitted in the first friction contact surface 12 between nut 6 and hub 23. A second moment of friction $M_2$ can be transmitted in the second friction contact surface 13 between hub 23 and shaft 3.

Figure 7:
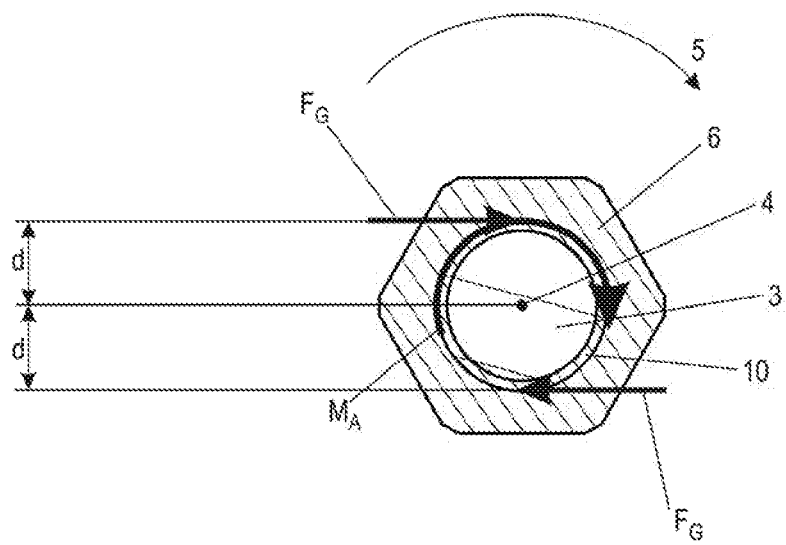
FIG. 7 shows a sectional illustration of the driveshaft along the line VII-VII in FIG. 6.

FIG. 7 shows the nut 6 screwed onto the shaft 3, in a sectional view. In the tensioned state of the hub 23 of the blower wheel 7, a thread frictional force $F_G$ is present in the thread section 11. The thread frictional force $F_G$ acts tangentially with respect to the peripheral direction of the rotational axis 4 and has a distance d from the rotational axis 4. The distance d corresponds to the radius of the thread 10. The acting thread moment of friction $M_A$ is formed from the product of the thread frictional force and the distance d of the latter from the rotational axis 4. The thread moment of friction $M_A$ acting between the nut 6 and the shaft 3 in the thread section 11 can be increased by the distance d and/or the thread frictional force $F_G$ being increased. The acting thread moment of friction $M_A$ can be transmitted between the nut 6 and the shaft 3 with and counter to the rotational direction 5. In the embodiment, the thread 10 is in the form of a fine pitch thread. In an embodiment, the fine pitch thread is defined in accordance with DIN ISO 261/262. In an embodiment, the thread 10 is in the form of a metric fine pitch thread with a nominal diameter of 12 mm and a pitch of 1.25.

Figure 8:
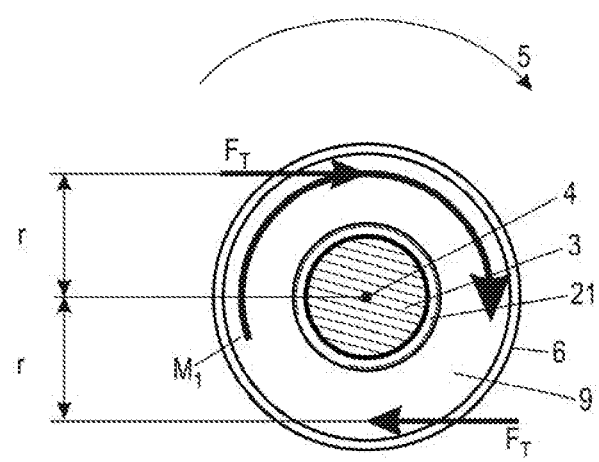
FIG. 8 shows a sectional illustration of the driveshaft along the line VIII-VIII in FIG. 6.

FIG. 8 shows the first friction contact surface 12 of the nut 6 and of the hub 23 in a sectional view. In the first friction contact surface 12, the nut 6 and the hub 23 are tensioned against each other, and therefore a contact force arises between the nut 6 and the hub 23. The contact force generates a tangential force $F_T$ which corresponds to a frictional force. In the first friction contact surface 12, the tangential force $F_T$ acts tangentially with respect to the rotational axis 4 and has a distance r from the rotational axis 4. The first moment of friction $M_1$ forming in the first friction contact surface 12 is the product of the tangential force $F_T$ and the distance r thereof from the rotational axis 4. Accordingly, the first moment of friction $M_1$ acting in the first friction contact surface 12 can be increased by the distance r and/or the tangential force $F_T$ being increased. The distance r increases if, for example, the distance of the first friction contact surface 12 from the rotational axis 4 or at least the outer diameter of the friction contact surface 12 is increased. The distance r is at least 1.3 times, in an embodiment at least 1.5 times, in particular at least 1.7 times the distance d. The first moment of friction $M_1$ can be transmitted between the nut 6 and the hub 23 with and counter to the rotational direction 5.

In the embodiment, the first friction contact surface 12 between the nut 6 and the hub 23 is configured in such a manner that the first moment of friction $M_1$ is greater than the thread moment of friction $M_A$ acting in the thread section 11 between nut 6 and shaft 3. If nut 6 and hub 23 are in contact, and the hub 23 is rotated relative to the shaft 3, the nut 6 is carried along by the hub 23.

The rotation of the hub 23 relative to the shaft 3 results from the fact that the hub 23 and the shaft 3 are merely connected in a manner locked by frictional force, and the initially applied tightening moment does not or does not completely compensate for the moment of inertia of the blower wheel 7. As long as the hub 23 spins on the shaft 3, the hub 23 executes a relative movement counter to the rotational direction of the shaft 3.

Figure 9:
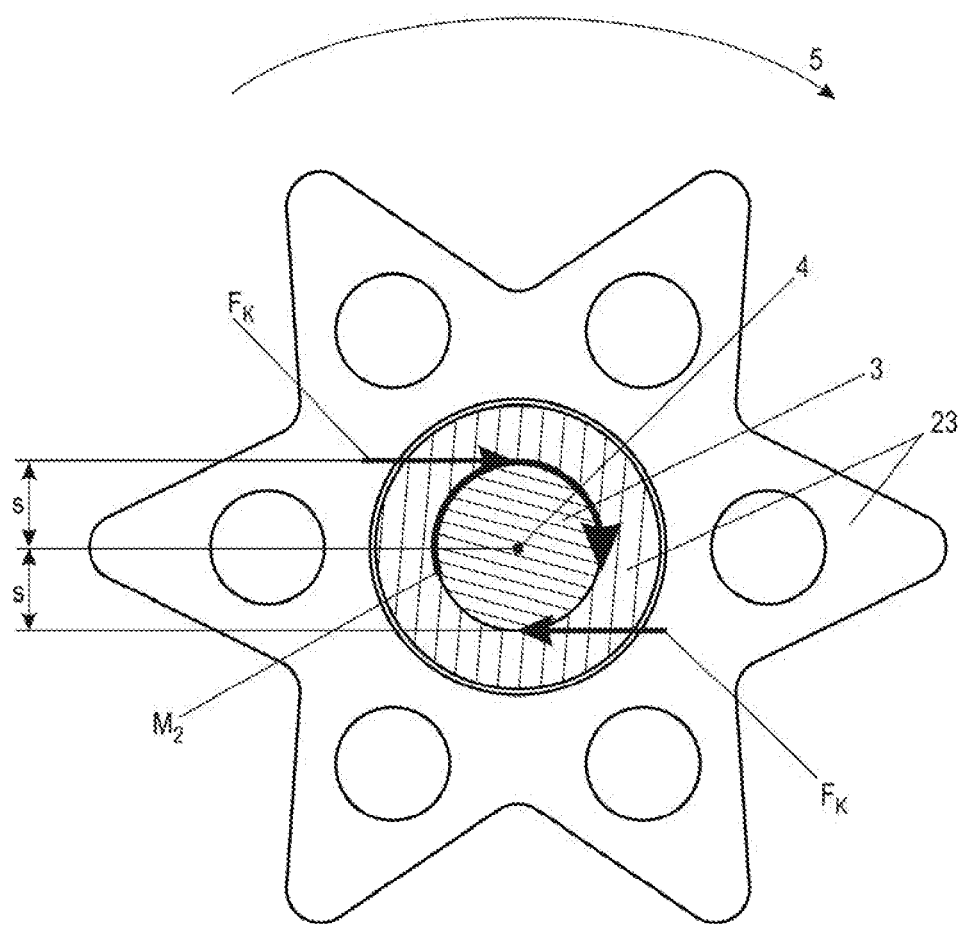
FIG. 9 shows a sectional illustration of the driveshaft along the line IX-IX in FIG. 6.

FIG. 9 shows a sectional view of the shaft 3, running through the second friction contact surface 13 between the hub 23 and the shaft 3. In the second friction contact surface 13, the hub 23 and the shaft 6 are tensioned in relation to each other, and therefore a contact force arises between the hub 23 and the shaft 3. The contact force generates a cone frictional force $F_K$. In the second friction contact surface 13, the cone frictional force $F_K$ acts tangentially with respect to the rotational axis 4 and has a distance s from the rotational axis 4. The second moment of friction $M_2$ forming in the second friction contact surface 13 is the product of the cone frictional force $F_K$ and the distance s thereof from the rotational axis 4. Accordingly, the second moment of friction $M_2$ acting in the second friction contact surface 13 can be increased by the distance s and/or the cone frictional force $F_K$ being increased. The second moment of friction $M_2$ can be transmitted between the hub 23 and the shaft 3 with and counter to the rotational direction 5. In the embodiment, the distance s between the cone frictional force $F_K$ and the rotational axis 4 is greater than the distance d. The friction pairings between the nut 6 and the shaft 3, the hub 23 and the shaft 3 and also the hub 23 and the nut 6 have a different distance (d, s, r), as measured radially with respect to the rotational axis 4, from the rotational axis 4. In an embodiment, the distance r between the rotational axis 4 and the tangential force $F_T$ is greater than the inner radius d of the nut 6. This ensures that the nut 6 is carried along by the hub 23 as long as the hub 23 spins on the shaft 3. In an embodiment, the distance s is smaller than the distance r, and the distance s is greater than the inner radius d of the nut 6. In an embodiment, the distance s is at least 1.2 times the distance d. In an embodiment, the distance s can also be smaller than the inner radius d of the nut 6.

The blower wheel 7 is fastened on the shaft 3 in accordance with the method described below:

The blower wheel 7 is pushed onto the shaft 3 and centered via the cone 37 of the shaft 3. The nut 6 is subsequently screwed onto the thread section 11 of the shaft 3 such that the nut 6 and the blower wheel 7 make contact in the first friction contact surface 12. The nut 6 can be tightened here against the blower wheel 7 by the operator with a minimum tightening moment which is between 10% and 100% of the operating torque. If the nut 6 is tightened with a tightening moment which is less than the minimum tightening moment, the first moment of friction $M_1$ which is transmittable between the nut 6 and the blower wheel 7 via the first friction contact surface 12 is not necessarily greater than the acting thread moment of friction $M_A$. In order to ensure retightening of the connection during operation, the operator has to tighten the nut 6 at least with the structurally defined minimum tightening moment. The minimum tightening moment here is configured in such a manner that it is between 10% and 100% of the operating torque. In the embodiment, the operating torque is approximately 100 Nm. In an embodiment, the minimum tightening moment is at least 30% of the operating torque. In an embodiment, the minimum tightening moment is at most 90%, in particular at most 80% of the operating torque. It is accordingly sufficient if the operator tensions the nut 6 against the blower wheel 7 only with a small tightening moment.

During the operation of the handheld work apparatus 1, the nut 6 is retensioned without intervention of the operator until the sum of the acting thread moment of friction $M_A$ and the second moment of friction $M_2$ corresponds to the operating torque acting on the blower wheel 7 and the hub 23 of the blower wheel 7 therefore no longer slips through on the shaft 3. If the blower wheel 7 slips through on the shaft 3, a relative movement between the blower wheel 7 and the shaft 3 arises. Since the nut 6 and the hub 23 are already in friction contact with each other, and the first friction pairing is coordinated in such a manner that the first moment of friction $M_1$ between the nut 6 and the hub 23 is always greater than the thread moment of friction $M_A$, acting in the thread section 11, between the shaft 3 and the nut 6, no relative movement takes place between the hub 23 and the nut 6 and instead the nut 6 is rotated relative to the shaft 3 by the blower wheel 7. The nut 6 is rotated further here on the thread section 11 and is tensioned axially against the cone 37 of the shaft 3 via the blower wheel 7 in the direction of the rotational axis 4. The blower wheel 7 is pressed here against the cone 37 of the shaft 3 and retensioned, as a result of which the normal force acting on the second friction contact surface 13 is increased. If the second moment of friction $M_2$ is of a size sufficient for no relative movement to take place any longer between blower wheel 7 and the shaft 3, the nut 6 is tightened with the final acting thread moment of friction $M_A$. In order to release the nut 6, the final acting thread moment of friction $M_A$ and the first moment of friction $M_1$ have to be overcome. The nut 6 is released independently of the second moment of friction $M_2$ acting between the blower wheel 7 and the cone 37 of the shaft 3. In order to release the nut 6, rotation of the blower wheel 7 is not required since the nut 6 can be rotated in relation to the blower wheel 7 after the first moment of friction $M_1$ is overcome.

In an embodiment, a third of the operating moment acting on the blower wheel 7 is transmitted to the shaft 3 via the acting thread moment of friction $M_A$ and two-thirds thereof is transmitted to the shaft 3 via the second moment of friction $M_2$. As a result, for the releasing of the nut 6 from the shaft 3, only the acting thread moment of friction $M_A$ of a magnitude of a third of the operating moment plus the first moment of friction $M_1$ between the nut 6 and the hub 23 has to be overcome. The first moment of friction $M_1$ is coordinated in such a manner that it is only slightly greater than the thread moment of friction $M_G$. This ensures that the relative movement does not take place between the hub 23 and the nut 6, but rather between the nut 6 and the shaft 3. Accordingly, in order to release the nut 6, a moment of somewhat more than two-thirds of the operating torque has to be applied.

Figure 10:
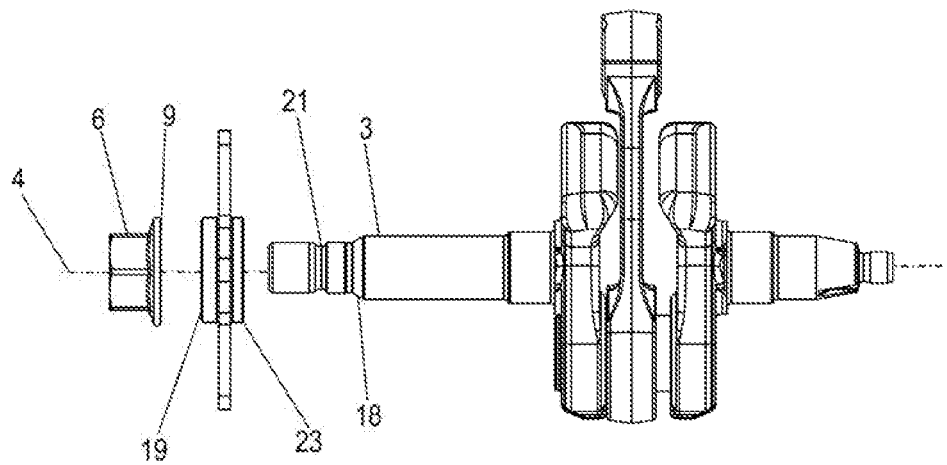
FIG. 10 shows an exploded illustration of the hub of the blower wheel and of the driveshaft of the blower apparatus according to FIG. 1 in side view.

FIGS. 10 and 11 show that the nut 6 has a contact surface 9 which is formed on that front end of the nut 6 which faces the connecting rod 32. The hub 23 of the blower wheel 7 has a first contact surface 19, which is formed on that front end of the hub 23 which faces away from the connecting rod 32, and a second contact surface 20 which is formed on the cone 38 of the hub 23. A contact surface 18 of the shaft 3 is formed on the cone 37 of the shaft 3. In the viewing direction perpendicular to the longitudinal plane 8, which contains the rotational axis 4, the second contact surface 20 of the blower wheel 7 together with the rotational axis 4 forms a hub cone angle β which is shown in FIG. 11 and is open in the direction of the connecting rod 32. In a viewing direction perpendicular to the longitudinal plane 8, the contact surface 18 of the shaft 3 together with the rotational axis 4 forms a shaft cone angle γ which is likewise open toward the connecting rod 32. The tolerances of the cone 37 of the shaft 3 and of the cone 38 of the hub 23 are such that an extensive contact or at least a linear contact advantageously arises over a largest radius c (FIG. 12) of the cone 37 of the shaft 3. For this purpose, the shaft cone angle γ is set to be greater than the hub cone angle β. Since the shaft cone angle γ is greater than the hub cone angle β, the second contact surface 20 of the blower wheel 7 is in contact with the contact surface 18 of the shaft 3 at a maximum distance from the rotational axis 4 in the second friction contact surface 13, the distance corresponding to the largest radius c of the cone 37 of the shaft 3. Accordingly, the cone frictional force $F_K$ also acts at a maximum distance from the rotational axis 4, as a result of which a large second moment of friction $M_2$ is generated.

In an embodiment, the shaft cone angle γ is at maximum one degree, in particular at maximum half a degree, larger than the hub cone angle β. If the hub cone angle β and the shaft cone angle γ differ, the contact surface angle α between the second friction contact surface 13 and the rotational axis 4 of the shaft 3 corresponds to the shaft cone angle γ.

Figure 12:
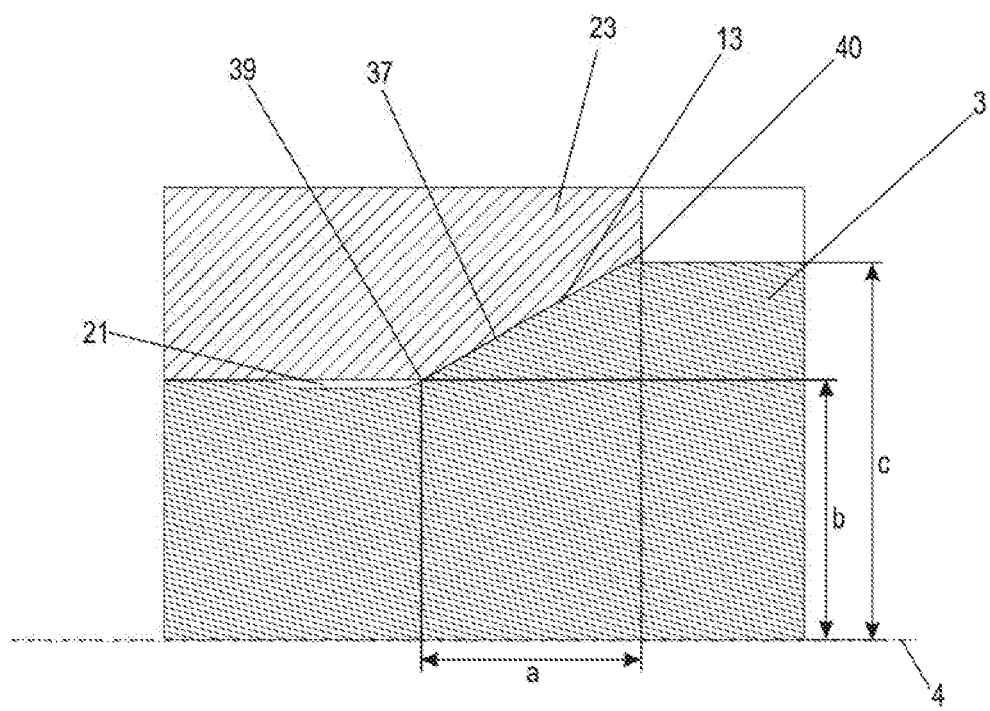

As FIG. 12 shows, the cone 37 of the shaft 3 extends from a first end 39 as far as a second end 40 of the cone 37. The radius b of the shaft 3 at the first end 39 of the cone 37 is smaller than the radius c of the shaft 3 at the second end 40 of the cone 37. In an embodiment, the radius b of the shaft 3 at the first end 39 corresponds at least to 60%, in particular at least 65% of the radius c at the second end 40 of the cone 37 of the shaft 3. In the embodiment, the radius b of the first end 39 corresponds at maximum to 80%, in particular at maximum 75% of the radius c of the shaft 3 at the second end of the cone 37. The cone 37 has a length a, as measured in the direction of the rotational axis 4, which corresponds to the distance, measured in the direction of the rotational axis 4, between the first end 39 and the second end 40 of the cone 37 of the shaft 3. In an embodiment, the length a is smaller than the radius c at the second end 40 of the cone 37 of the shaft 3, in particular smaller than the radius b of the shaft 3 at the first end 39 of the cone 37.

The fastening of the blower wheel 7 that is shown in the embodiment can be used in handheld work apparatuses which have a blower wheel 7, such as, for example, suction apparatuses or the like. Such an automatically retightening fastening of the blower wheel 7 is not only restricted to blower wheels 7 for conveying working air. The blower wheel 7 can in particular also be a blower wheel for conveying cooling air, in particular cooling air for the combustion engine.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
   a shaft;
   a drive motor configured to drive said shaft in a rotating manner about a rotational axis during operation of said handheld work apparatus;
   a nut having an end face;
   a blower wheel held on said shaft via said nut in a manner locked against rotation by frictional force;
   said nut being configured separate from said blower wheel;
   said nut and said shaft being in contact via a thread section wherein an acting thread moment of friction ($M_A$) acting about said rotational axis is transmittable between said nut and said shaft via said thread section;
   said nut and said blower wheel being in contact via a first friction contact surface wherein a first moment of friction ($M_1$) acting about said rotational axis is transmittable between said nut and said blower wheel via said first friction contact surface;
   said blower wheel and said shaft being in contact via a second friction contact surface;
   said nut having a minimum tightening moment between 10% and 100% of an operating torque;
   said first friction contact surface being configured such that, at said minimum tightening moment of said nut, said first moment of friction ($M_1$) transmittable between said nut and said blower wheel via said first friction contact surface is greater than said acting thread moment of friction ($M_A$), and therefore, during the operation of the work apparatus when there is a relative movement between said blower wheel and said shaft, said blower wheel moves said nut along therewith via said first moment of friction ($M_1$) acting at said first friction contact surface so that said nut retensions said blower wheel against said shaft via said second friction contact surface;

said nut lying only with said end face thereof against said blower wheel so as to permit relative rotation between said nut and said blower wheel; and, said second friction contact surface running conically with respect to the rotational axis.

2. A handheld work apparatus comprising:

a shaft;

a drive motor configured to drive said shaft in a rotating manner about a rotational axis during operation of said handheld work apparatus;

a nut having an end face;

a blower wheel held on said shaft via said nut in a manner locked against rotation by frictional force;

said nut being configured separate from said blower wheel;

said nut and said shaft being in contact via a thread section wherein an acting thread moment of friction ($M_A$) acting about said rotational axis is transmittable between said nut and said shaft via said thread section;

said nut and said blower wheel being in contact via a first friction contact surface wherein a first moment of friction ($M_1$) acting about said rotational axis is transmittable between said nut and said blower wheel via said first friction contact surface;

said blower wheel and said shaft being in contact via a second friction contact surface;

said nut having a minimum tightening moment between 10% and 100% of an operating torque;

said first friction contact surface being configured such that, at said minimum tightening moment of said nut, said first moment of friction ($M_1$) transmittable between said nut and said blower wheel via said first friction contact surface is greater than said acting thread moment of friction ($M_A$), and therefore, during the operation of the work apparatus when there is a relative movement between said blower wheel and said shaft, said blower wheel moves said nut along therewith via said first moment of friction ($M_1$) acting at said first friction contact surface so that said nut retensions said blower wheel against said shaft via said second friction contact surface;

said nut lying only with said end face thereof against said blower wheel so as to permit relative rotation between said nut and said blower wheel; and, said second friction contact surface running conically with respect to the rotational axis;

wherein said nut defines an inner radius (d); a tangential force ($F_T$), which forms said first moment of friction ($M_1$), at said first friction contact surface acts at a distance (s) from said rotational axis in a peripheral direction of the rotational axis; and, said distance (s) corresponds at least to 1.5 times said inner radius (d) of said nut at said thread section.

3. A handheld work apparatus comprising:

a shaft;

a drive motor configured to drive said shaft in a rotating manner about a rotational axis during operation of said handheld work apparatus;

a nut having an end face;

a blower wheel held on said shaft via said nut in a manner locked against rotation by frictional force;

said nut being configured separate from said blower wheel;

said nut and said shaft being in contact via a thread section wherein an acting thread moment of friction ($M_A$) acting about said rotational axis is transmittable between said nut and said shaft via said thread section;

said nut and said blower wheel being in contact via a first friction contact surface wherein a first moment of friction ($M_1$) acting about said rotational axis is transmittable between said nut and said blower wheel via said first friction contact surface;

said blower wheel and said shaft being in contact via a second friction contact surface;

said nut having a minimum tightening moment between 10% and 100% of an operating torque;

said first friction contact surface being configured such that, at said minimum tightening moment of said nut, said first moment of friction ($M_1$) transmittable between said nut and said blower wheel via said first friction contact surface is greater than said acting thread moment of friction ($M_A$), and therefore, during the operation of the work apparatus when there is a relative movement between said blower wheel and said shaft, said blower wheel moves said nut along therewith via said first moment of friction ($M_1$) acting at said first friction contact surface so that said nut retensions said blower wheel against said shaft via said second friction contact surface;

said nut lying only with said end face thereof against said blower wheel so as to permit relative rotation between said nut and said blower wheel; and, said second friction contact surface running conically with respect to the rotational axis;

wherein said second friction contact surface and the rotational axis enclose an angle (a) of at least 15°.

4. The work apparatus of claim 1, wherein said second friction contact surface and the rotational axis enclose an angle ($\alpha$) of at most 75°.

5. The work apparatus of claim 1, wherein said second friction contact surface is configured and arranged such that there is no self-locking between said blower wheel and said nut in said second friction contact surface.

6. The work apparatus of claim 1, wherein said shaft has a shaft contact surface; said blower wheel has a second blower wheel contact surface; and, said second friction contact surface includes two surfaces which are in contact, wherein said two surfaces are said shaft contact surface and said second blower wheel contact surface.

7. The work apparatus of claim 6, wherein, in a top view of a longitudinal plane containing the rotational axis, an angle ($\beta$) between said second blower wheel contact surface and the rotational axis is smaller than an angle ($\gamma$) between said shaft contact surface and the rotational axis.

8. The work apparatus of claim 1, wherein said nut has a nut contact surface; said blower wheel has a first blower wheel contact surface; and, said first friction contact surface includes two surfaces which are in contact, wherein said two surfaces are said nut contact surface and said first blower wheel contact surface.

9. The work apparatus of claim 1, wherein said thread section includes a thread in the form of a fine pitch thread.

10. The work apparatus of claim 1, wherein said shaft has a cylindrical section formed thereon; and, said blower wheel is supported against inclination with respect to said shaft on said cylindrical section.

11. The work apparatus of claim 1, wherein said blower wheel has a hub and a wheel fastened on said hub; and, said nut lies with said end face thereof against said hub.

12. The work apparatus of claim 11, wherein said hub is made of a metal.

13. The work apparatus of claim 11, wherein said hub is made of a sintered metal.

14. The work apparatus of claim 1, wherein said blower wheel and said shaft are mutually connected in a friction force-fitting manner.

15. The work apparatus of claim 1, wherein said first friction contact surface is disposed between said nut and said blower wheel in a plane lying perpendicular to said rotational axis of said shaft.

* * * * *